United States Patent [19]

Mizuta et al.

[11] Patent Number: 5,835,020
[45] Date of Patent: Nov. 10, 1998

[54] MULTIPLE COMMUNICATION SYSTEM AND APPARATUS

[75] Inventors: Ken Mizuta, Miyagi-ken; Ken Shibata; Yukio Miura, both of Furukawa, all of Japan

[73] Assignee: Alps Electric Co., Ltd, Tokyo, Japan

[21] Appl. No.: 673,968

[22] Filed: Jul. 1, 1996

Related U.S. Application Data

[63] Continuation of Ser. No. 245,790, May 19, 1994, abandoned.

[30] Foreign Application Priority Data

May 19, 1993 [JP] Japan .................................. 5-117292

[51] Int. Cl.$^6$ ........................................................ H04Q 1/00
[52] U.S. Cl. ........................................ 340/825.06; 307/10.1
[58] Field of Search ........................ 340/825.06, 825.31, 340/825.32, 825.22, 426; 307/10.2, 10.3, 10.4, 10.1; 395/200.1; 364/424.045, 424.059; 315/83; 318/444; 701/36, 49

[56] References Cited

U.S. PATENT DOCUMENTS

| | | | |
|---|---|---|---|
| 4,139,801 | 2/1979 | Linares | 315/83 |
| 4,481,450 | 11/1984 | Watanabe et al. | 318/444 |
| 4,754,255 | 6/1988 | Sanders et al. | 307/10.4 |
| 4,760,275 | 7/1988 | Sato et al. | 307/10.1 |
| 4,788,637 | 11/1988 | Tamaru | 395/200.1 |
| 4,812,838 | 3/1989 | Tashiro et al. | 340/825.06 |
| 5,081,586 | 1/1992 | Barthel et al. | 364/424.059 |
| 5,113,182 | 5/1992 | Suman et al. | 340/825.32 |
| 5,168,272 | 12/1992 | Akashi et al. | 340/825.06 |
| 5,251,211 | 10/1993 | Mutoh et al. | |
| 5,278,547 | 1/1994 | Suman et al. | 340/825.31 |
| 5,351,041 | 9/1994 | Ikata et al. | 340/825.06 |

Primary Examiner—Edwin C. Holloway, III
Attorney, Agent, or Firm—Brinks Hofer Gilson & Lione

[57] ABSTRACT

A multiple communication system used in an automobile includes miniaturized multi-function electric units. Each electric unit is composed of a CPU and a bus driver, and the CPU is connected to a bus line through the bus driver. The CPU of each of the electric units includes a communication processing program, and communication can be carried out among the electric units through the bus line using the communication processing program. Each CPU can be connected to its associated bus driver through only two data I/O ports. Thus, the number of I/O data ports is reduced as compared with the case in which conventional communication ICs are used. Further, since the bus drivers of small size are used, the electric units can be miniaturized. Further, the communication processing program of each CPU can be rewritten through the bus line.

5 Claims, 20 Drawing Sheets

FIG. 8A
PRIOR ART
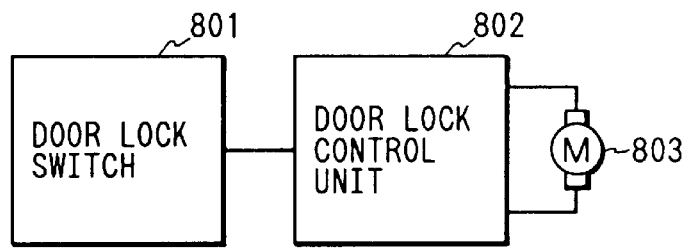
"NOT COMPLYING WITH KEYLESS"
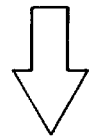
FIG. 8B
PRIOR ART
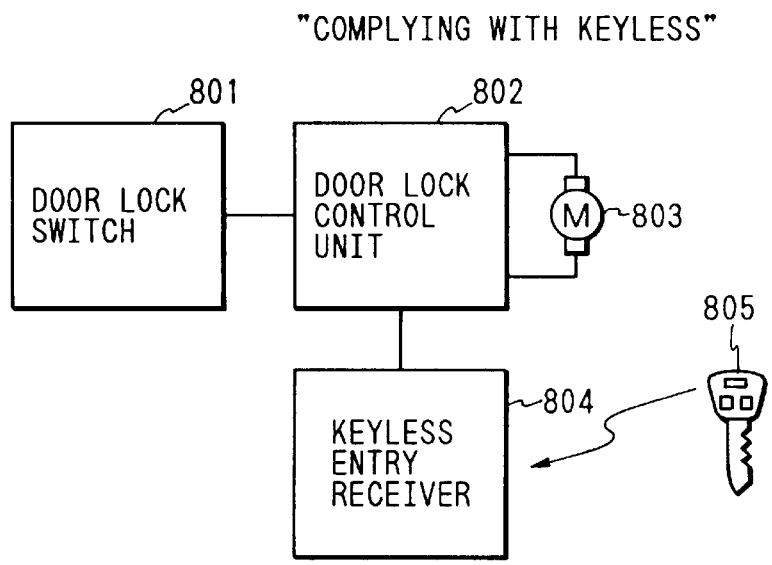

FIG. 9A
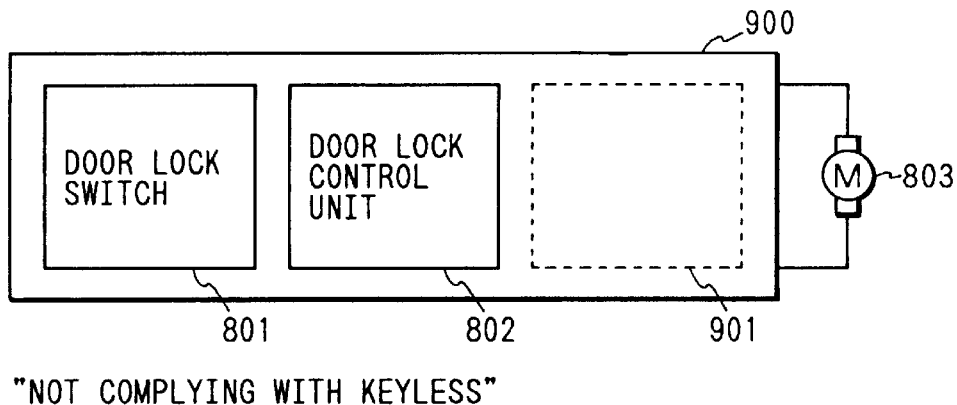
"NOT COMPLYING WITH KEYLESS"
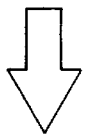
FIG. 9B "COMPLYING WITH KEYLESS"
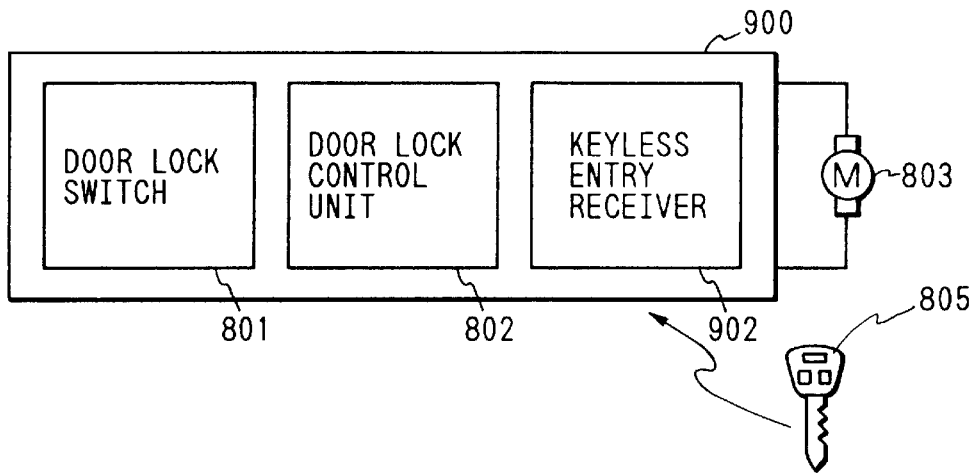

MULTIPLE COMMUNICATION SYSTEM AND APPARATUS

This application is a continuation of application Ser. No. 08/245,790 filed May 19, 1994, now abandoned.

BACKGROUND OF THE INVENTION

1. Field of the Invention

The present invention relates to a multiple communication system among respective control units provided in an automobile.

2. Description of the Related Art

The operation of recent automobiles is simplified by enabling windows, mirrors and the like to be automatically operated without using hands, which is very convenient to a driver and fellow passengers. For this purpose, electric units 101, 102 are provided with respective objects to be operated such as windows, mirrors and the like and these electric units 101, 102 and a host computer 100 are interconnected through a bus line 103, as shown in FIG. 21.

Each of these electric units 101, 102 is composed of a communication IC and a CPU and the CPU controls an object to be operated by the electric unit. Further, the communication IC for regulating a communication procedure through the bus line controls a communication path and creates and decodes communication waveforms.

Nevertheless, since the communication procedure is determined by the communication IC in the above prior art, when this procedure is to be changed, the communication IC must be changed, which requires, as shown in FIG. 22, such a job that the communication IC 101 is removed from the multiple communication system and thus from the automobile, the ROM (read only memory) 104 of the communication IC is replaced with a ROM 105 in which data having a necessary content is stored and then the communication IC is mounted on the multiple communication system. This job, however, is very time consuming.

Further, since each electric unit requires the communication IC in addition to the CPU, it has a relatively large size and thus a large space is needed for each electric unit in the automobile, which is not preferable. More specifically, when more parts of automobile are intended to be automatically operated, a space of electric units used for the automatic operation occupies a large weight in the design of automobile.

Further, the CPU constituting each electric unit needs many ports for the connection with the communication IC. For example, the CPU needs 5 ports in the example shown in FIG. 23. This is because that a clock signal, data I/O signals, chip select signals, and reset signals must be transmitted between the communication IC and the CPU, as shown in FIG. 24. Since the CPU uses many ports to the communication IC as described above, the function of the CPU is restricted accordingly and the CPU cannot be effectively used.

An object of the present invention is to solve the aforesaid problems and provide a multiple communication system for automobile with miniaturized electric units each having a multi-functional CPU.

Another object of the present invention is to provide a multiple communication system for automobile by which a communication procedure can be easily changed.

SUMMARY OF THE INVENTION

To achieve the above object, according to the present invention, each of electric units interconnected through a bus line is composed of control means including a communication processing program.

Further, to achieve the above another object, according to the present invention, the communication processing program can be changed from the outside through the bus line.

Since the electric unit carries out a process for communication executed through the bus line by the communication processing program, the communication IC as employed in prior art is not needed so that the size of the electric unit can be reduced. Further, since the CPU of the electric unit can be connected to the bus line only through a bus drive, the number of the ports of the CPU can be reduced. Consequently, the ports not in use can be used for the connection to other units.

According to the electric unit, since the communication processing program can be changed through the bus line, it can be changed in the state that the electric unit is assembled to the system and thus to the automobile, whereby a job for changing the communication processing program is very simplified.

BRIEF DESCRIPTION OF THE DRAWINGS

FIGS. 8A and 8B are diagrams showing a job for changing a conventional automobile door lock mechanism not complying with a keyless operation to a door lock mechanism complying with the keyless operation;

FIGS. 9A and 9B are diagrams showing an example of an arm rest module containing keyless entry according to the present invention;

DESCRIPTION OF THE PREFERRED EMBODIMENTS

An embodiment of the present invention will be described with reference to the drawings.

Figure 1:
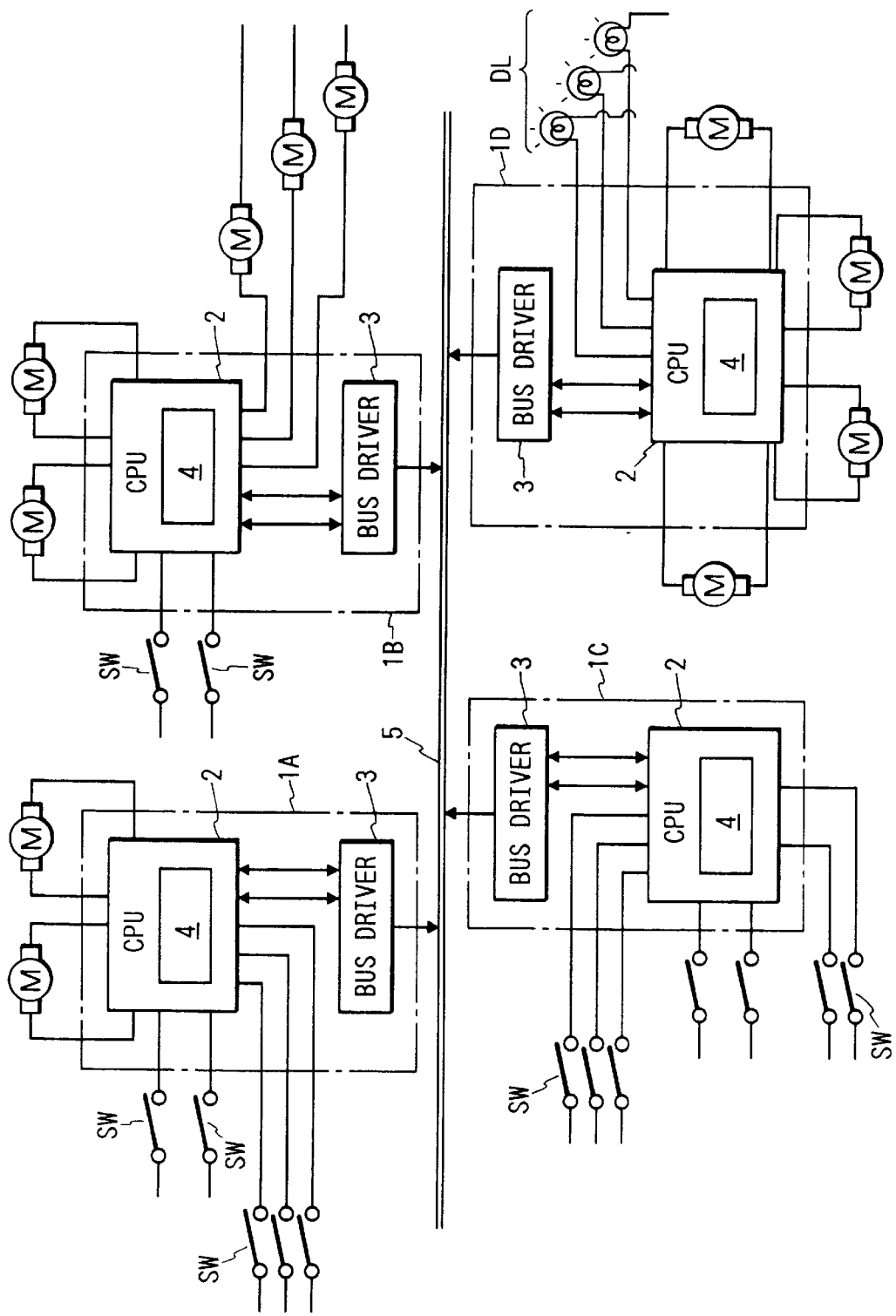
FIG. 1 is a diagram showing the arrangement of an embodiment of a multiple communication system according to the present invention.

FIG. 1 is a diagram showing the arrangement of an embodiment of a multiple communication system for automobile according to the present invention, wherein numerals 1A, 1B, 1C and 1D denote electric units, numeral 2 denotes CPUs, numeral 3 denotes bus drivers, numeral 4 denotes communication processing programs, numeral 5 denotes a bus line, SW denotes input switches, M denotes motors and DL denotes display lamps.

In the figure, the four electric units 1A, 1B, 1C and 1D are used as objects and interconnected through the bus line 5. Each of the electric units is composed of the CPU 2 and bus driver 3. The CPU 2 is provided with a rewritable ROM such as an EEPROM in which the communication processing program 4 is stored. This communication processing program 4 enables communication to be carried out among the electric units through the bus line 5.

The input switches SW are a window open/close switch, door clock switch and the like and turned Of/OFF by the operation carried out a driver and the like. Further, the motors M are a window open/close motor, seat drive motor and the like. In addition, the display lamps DL are respective display lamps disposed in a passenger compartment. Further, a power window drive motor and a door lock drive motor are connected to the electric unit 1A on a driver's seat side and thus the electric unit 1A controls the operation of the power window and door lock on the driver's seat side. In the same way, a powered window drive motor and a door lock drive motor are also connected to the electric unit 1B on an assistant driver's seat side and thus the electric unit 1B controls the operation of the power window and door lock on the assistant driver's seat side. As described above, the electric units each having a different function are connected to the bus line 5.

When the input switch SW to which the electric unit 1A is connected is turned ON by an input, the CPU 2 of the electric unit 1A is operated so that the motor M connected to the CPU is driven as necessary to control, for example, a power window. When, however, the motor M connected to other electric unit, e.g. the electric unit 1D must be driven, the CPU 2 of the electric unit 1A creates communication data in accordance with the communication processing program 4 and transfers the data to the electric unit 1D through the bus driver 3 and bus line 5. The CPU 2 of the electric unit 1D fetches the communication data through the bus driver 3 and carries out a process such as decoding of the data, and the like by means of the communication processing program and drives a predetermined motor M based on the result of the process.

Figure 23:
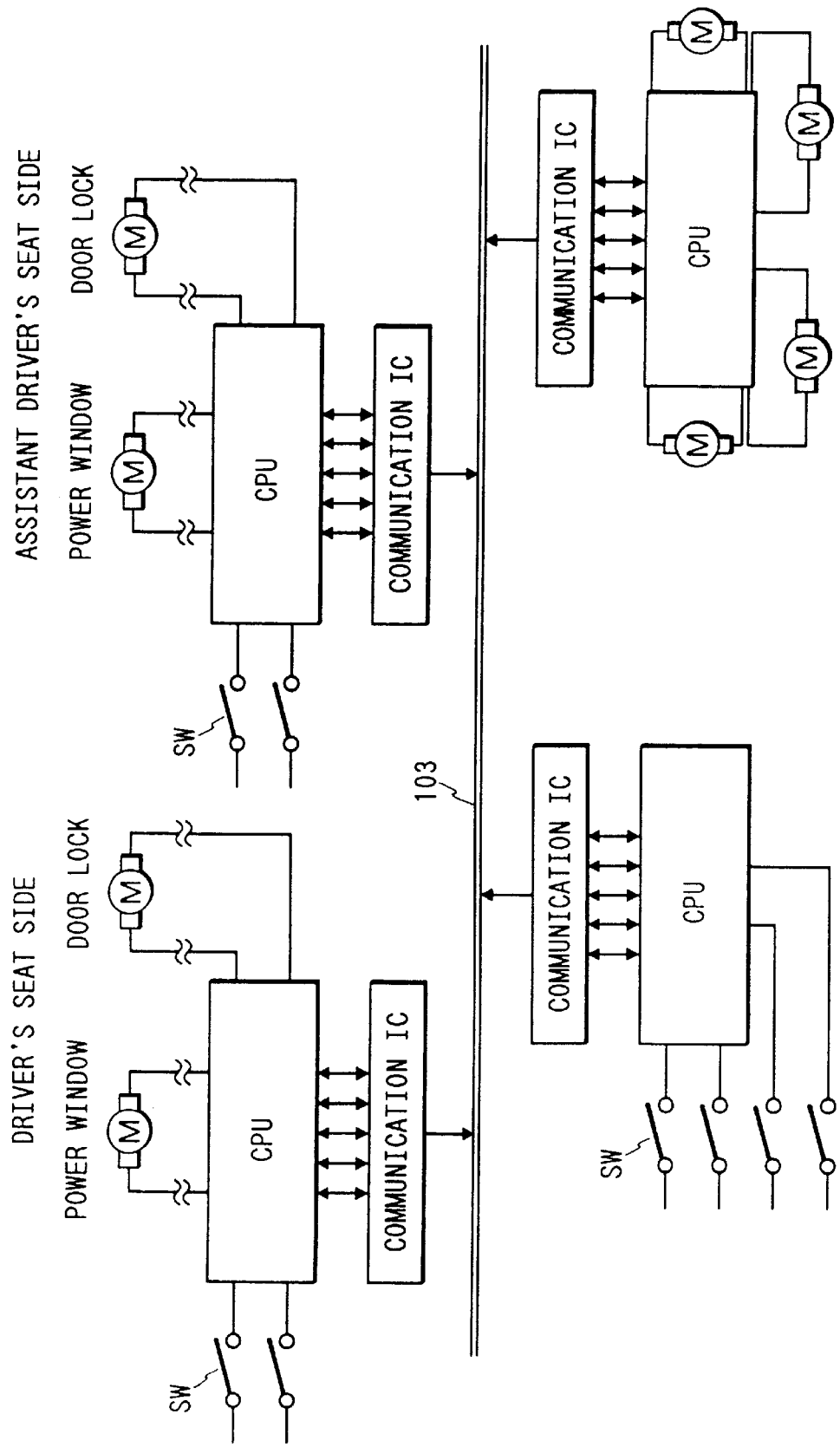
FIG. 23 is a diagram showing in detail the arrangement of the respective electric units of a conventional example shown in FIG. 21 and the connection thereof.
Figure 24:
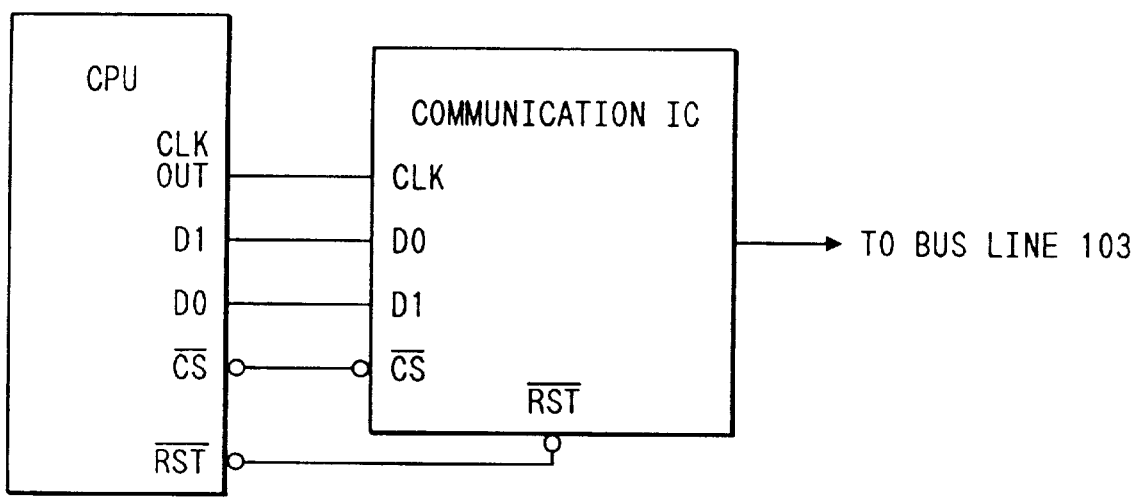
FIG. 24 is a diagram showing ports between a CPU and a communication IC in FIG. 23.

When this embodiment is compared with the prior art shown in FIG. 23, the CPU of the prior art requires five ports so that the CPU is connected to the bus line through the communication IC. On the contrary, since the CPU 2 of this embodiment is connected to the bus line 5 through the bus driver 3 composed of an I/O path shown in FIG. 2, only two I/O ports are needed for the connection and three ports can be used for other purposes. Therefore, these three ports can be used for the connection to the input switches SW as in the electric units 1A and 1C, for the connection to the motors M as in the electric unit 1B, and for the connection to the display lamps DL as in the electric unit 1D. As a result, the CPU 2 is multifunctioned so that the number of objects to be automatically operated can be increased without increasing the number of the electric units.

Figure 2:
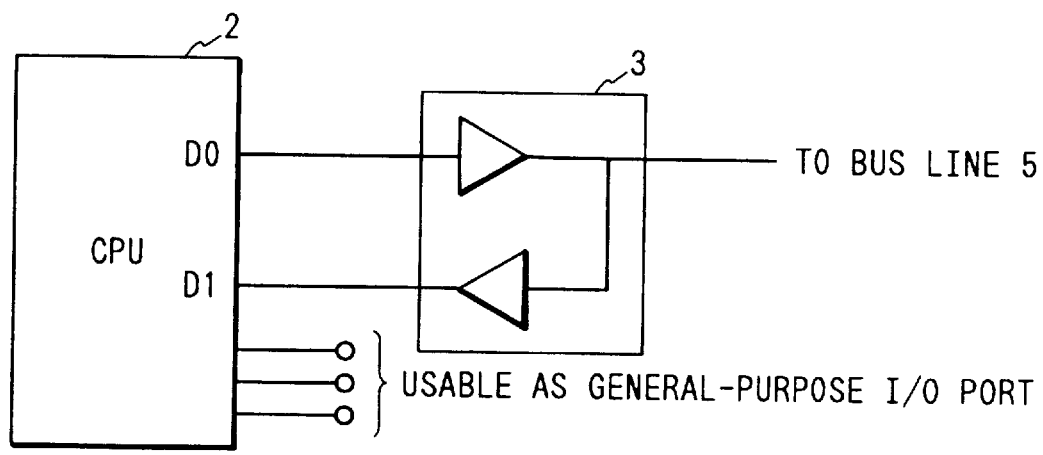
FIG. 2 is a diagram showing the arrangement of an electric unit in FIG. 1.

Further, the bus driver 3 has a very simple arrangement as shown in FIG. 2 and a very small size as compared with the communication IC used in FIG. 23. Thus, the electric unit can be miniaturized to reduce the space occupied thereby.

Figure 3:
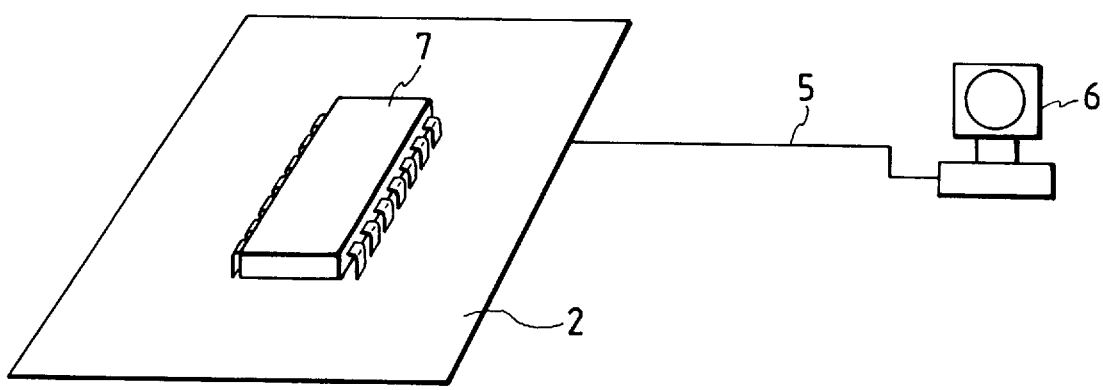
FIG. 3 is a diagram showing a method of changing a communication processing program in the electric unit in FIG. 1.

Further, the data of the rewritable ROM in which the communication programs of these electric units 1A–1D are stored can be rewritten through the bus line 5 and the rewriting operation can be carried out by the operation program of the CPU 2. The bus line 5 is provided with the connection terminal for a terminal unit, and when the communication procedure and the like are to be changed, the terminal unit 6 is connected to the bus line 5 and a predetermined communication processing program is input through the terminal unit 6 so that the program stored in the rewritable ROM 7 of the CPU of the predetermined electric unit 1 can be rewritten to the predetermined communication processing program through the terminal unit 6, as shown in FIG. 3. Therefore, a job for changing the communication procedure and the like can be easily carried out.

Next, the respective electric units of this embodiment will be described below.

Figure 4:
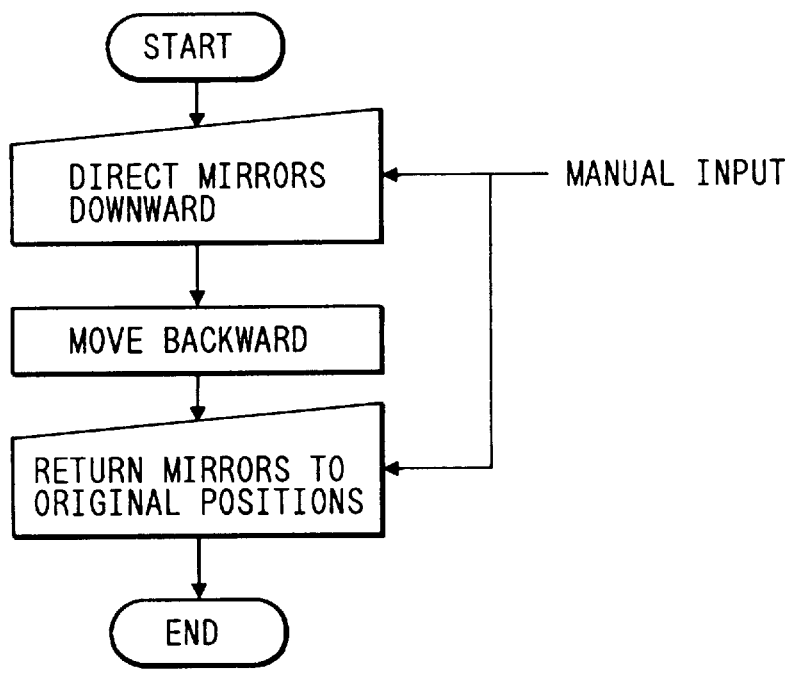
FIG. 4 is a flowchart showing a conventional automobile mirror position control.

(1) Mirror Position Control:

When an automobile is driven backward and put into a garage, a driver drives the automobile while observing the vicinity of rear wheels through mirrors. As shown in FIG. 4, however, in a conventional method, first the mirrors are manually directed downward so that the driver can observe the vicinity of the rear wheels and then the automobile is driven backward. When the backward movement of the automobile is finished or when the automobile is started later, the driver manually returns the mirrors to their original positions again. Thus, this operation is very troublesome because the manual operation is needed as described above.

Figure 5:
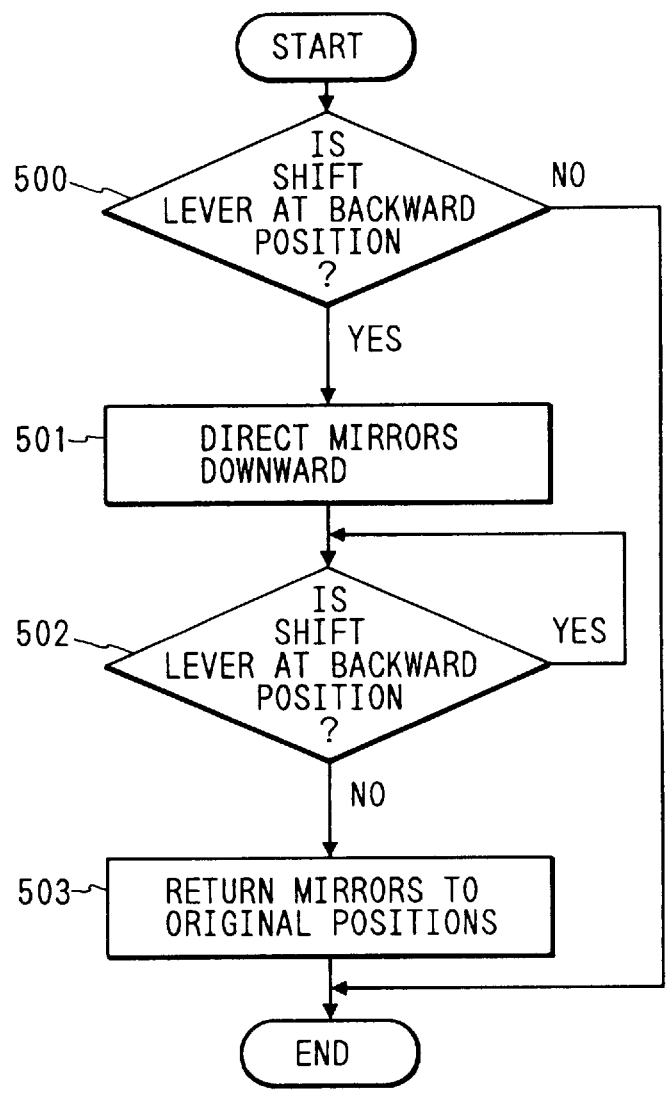
FIG. 5 is a flowchart showing a mirror position control according to the present invention.

On the other hand, according to this embodiment, when the shift lever of an automobile is entered into a "backward position" (step 500), the CPU of a mirror position control electric unit fetches and processes an input produced by the operation of the shift lever to direct mirrors downward so that the vicinity of rear wheels can be observed (step 501), as shown in FIG. 5. Then, the operation of the shift lever is monitored and when it is removed from the "backward position" (step 502), the mirrors are returned to their original positions (step 503).

Since the mirror position control is carried out as the shift lever is operated to drive the automobile backward as described above, the manual operation needed by the aforesaid prior art is not required. Thus, the automobile can be easily driven backward and such a trouble that the driver forgets to return the mirrors to their original positions can be avoided.

(2) Personal Seat Position Control:

When a driver's seat position and assistant driver's seat position are fixed, a driver and assistant driver are difficult to get on an automobile. To cope with this problem, recently, a personal position control is employed in such an arrangement that a drive position memory is mounted on the automobile and stores personal data for setting the position of seats, and when a driver and the like get on the automobile, the seats are moved backward based on the personal data, and when they sit down on the seats, a sensor detects it and returns the seats to their original positions.

Figure 6:
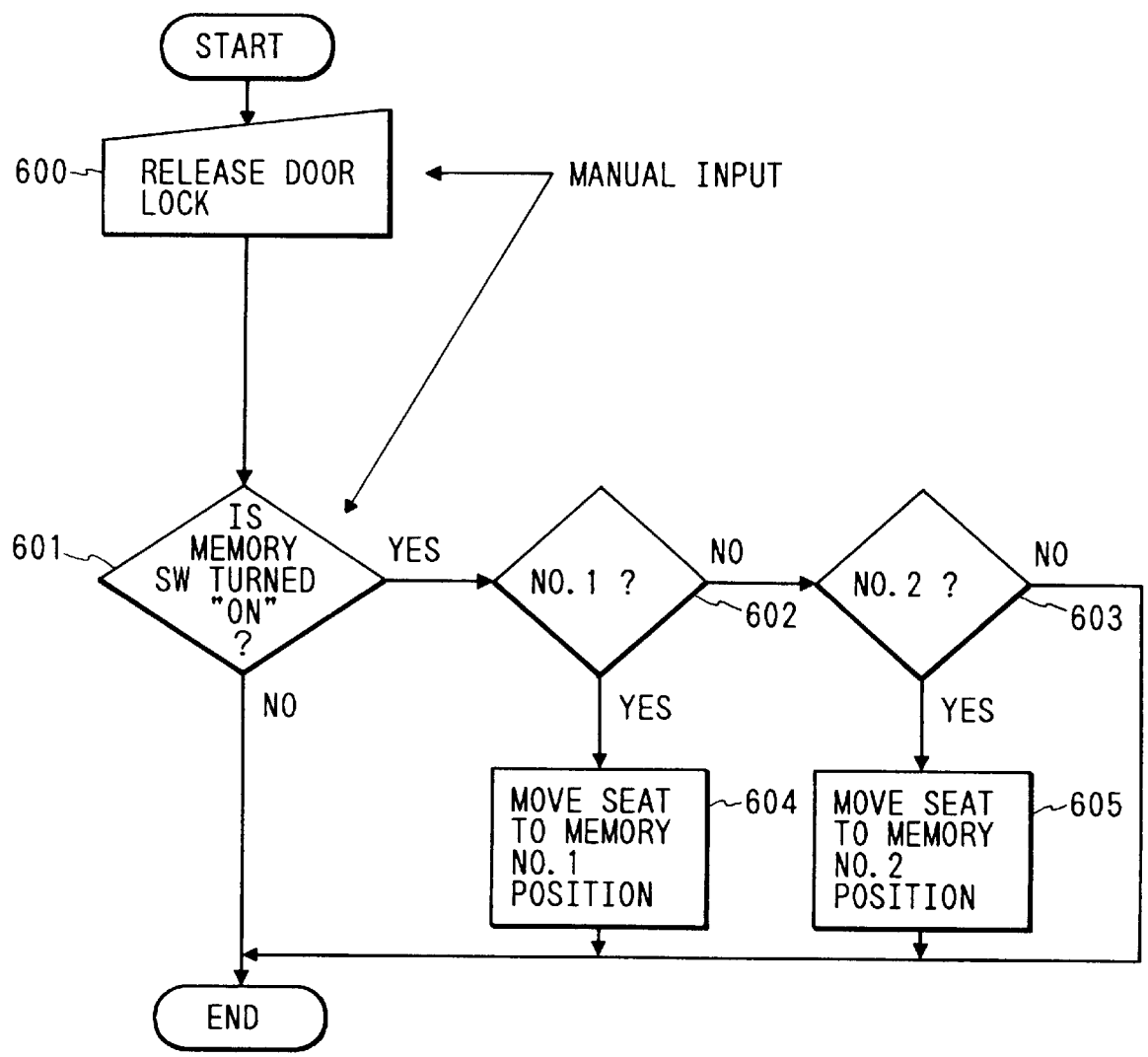
FIG. 6 is a flowchart showing the operation of a conventional personal seat positioning system.

FIG. 6 shows a conventional personal seat position control, wherein an electric unit for each of a driver's seat No. 1 and assistant driver's seat No. 2 includes a personal position memory which responds to the release of door lock and a switch corresponding to the memory.

More specifically, in FIG. 6, it is assumed that door lock on the driver or assistant driver side is released (step 600) and the switch of the personal position memory on the driver or assistant driver side is turned ON (step 601). When this switch is located on the driver's seat side (step 602), the driver's seat is moved backward and when the driver sits on the seat, the seat is returned to its original position (step 604). Further, when the switch on the assistant driver's seat side is turned ON (step 603), the assistant driver's seat is operated in the same way (step 605).

In this case, not only the release of the door lock (step 600) but also the operation of the switch of the personal position memory must be manually carried out, which is very troublesome.

On the other hand, this embodiment minimizes the manual operation necessary for the personal seat position control. More specifically, this embodiment is provided with an oscillator and a signal generated by the oscillator is transmitted without using a cable to release the door lock of an automobile. That is, this embodiment complies with a keyless operation which permits the use of a keyless entry ignition key (thereinafter, referred to as keyless entry).

Figure 7:
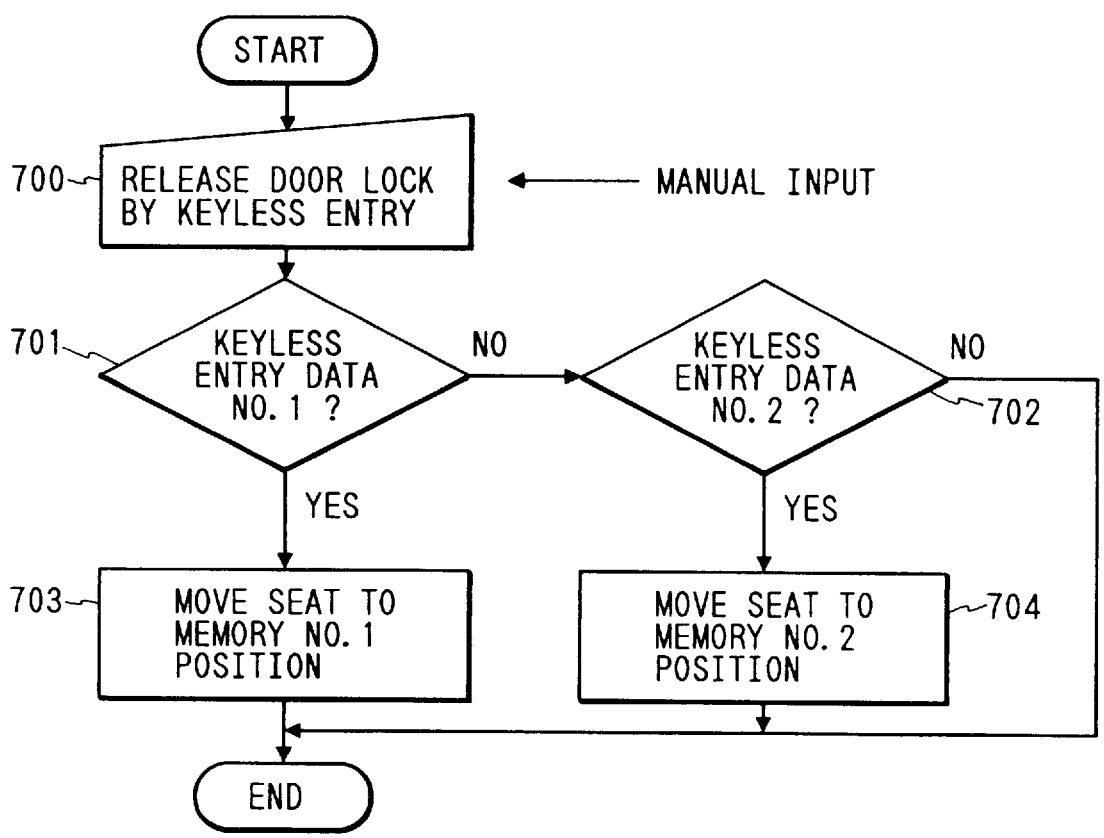
FIG. 7 is a flowchart showing the operation of a personal seat positioning system according to the present invention.

In this embodiment, a module recognizes a plurality of personal positions (a handle position, a seat position, a room mirror position, door mirror positions etc.) of the driver's seat. Then, in FIG. 7, when the door lock on the driver or assistant driver side is manually released by the keyless entry (step 700), the personal seat position control electric unit on the driver's side fetches an input corresponding to the release of the door (steps 701, 702), the CPU of the electric unit reads the personal data of the personal position memory corresponding to the type of the keyless signal so that the seat having been moved backward once is returned to a seat position corresponding to the personal data (steps 703, 704).

As described above, only the execution of the manual operation for releasing door lock causes the seat on a required side to be automatically moved once to an easily-getting-on position and when the seat is occupied, it is automatically set to a proper position. Therefore, a manual operation only for moving the seat is not needed, by which a troublesome job can be saved.

(3) Arm Rest Module Containing Keyless Entry:

Conventionally, since a keyless entry unit and a door lock control unit are independently provided with an automobile, when an automobile which does not comply with a keyless operation is to be modified to an automobile which comply with the keyless operation, a car owner must request a dealer or the like to replace the door lock control unit with a door lock control unit which comply with the keyless operation. This requires a job for the renewal of all the wirings. That is, a door lock switch is provided with each of the arm rests of a driver's seat and an assistant driver's seat, and as shown in FIG. 8A, the door lock switch 801 of the automobile which does not comply with the keyless operation is connected to the door lock control unit 802 which does not comply with the keyless operation but controls a door lock motor 803. In order to modify this door lock control unit to a type complying with the keyless operation, it must be additionally provided with a keyless entry receiver 804 for receiving a signal from a keyless entry 805. For this purpose, however, not only a wiring for connecting the door lock control unit 802 to the keyless entry receiver 804 is needed but also wirings must be renewed to cause the door lock control unit 802 to comply with the keyless operation.

On the other hand, as shown in FIG. 9, according to this embodiment, the door lock switch 801 and the door lock control unit 802 (which serve as one of the electric units in FIG. 1) are integrally arranged as an arm rest module 900 which is further provided with a space 901. Thus, when the arm rest module 900 does not comply with the keyless operation, the space 901 thereof is left as it is as shown in FIG. 9A, whereas when the arm rest module 900 complies with the keyless operation, a keyless entry receiver 902 is mounted to the space 901 of the arm rest module 900 as shown in FIG. 9B. In this case, terminals for the connection to the keyless entry receiver 902 are provided with the space 901, and when the keyless entry receiver 902 is mounted to the space 901, it is automatically connected to the door lock control unit 802.

As described above, this embodiment enables the arrangement not complying with the keyless operation to be easily modified to the arrangement complying with the keyless operation by a simple job.

(4) Zone Control of Air Conditioner

Figure 10A:
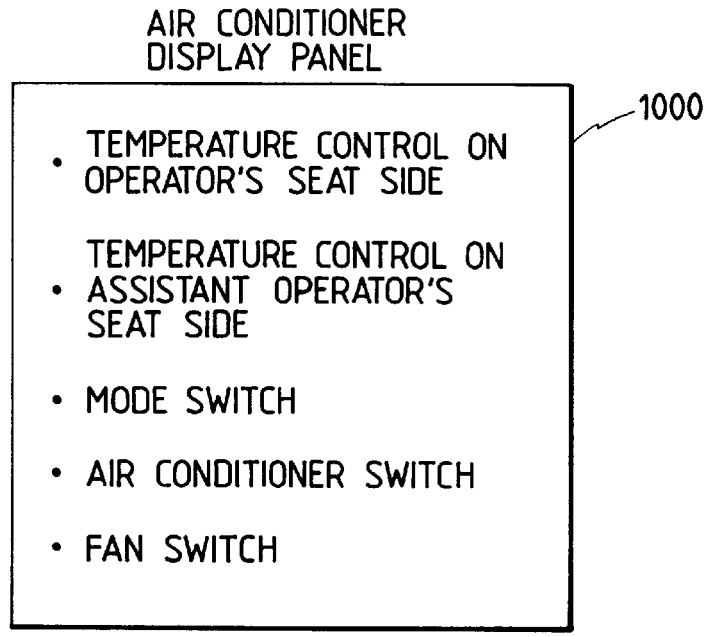
FIGS. 10A and 10B are diagrams showing an example of the layout of air conditioner switches in a conventional automobile.
Figure 10B:
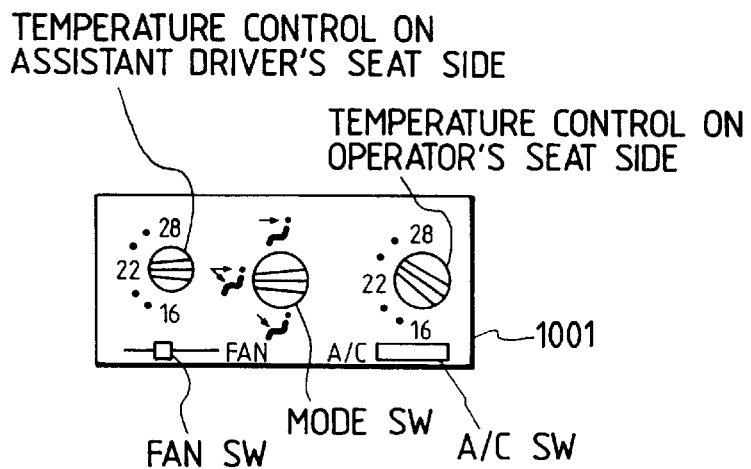

As respective units of an automobile are electronically controlled, a problem arises in that there is no space for disposing name display panels and operation switches, and further a zone control system is employed to an air conditioner so that the temperature of a driver's seat can be regulated independently of that of an assistant driver's seat. In this case, since these operation switches are disposed together on a front panel as shown in FIG. 10B, there is needed a region (panel) where the names of the respective switches are displayed so that they can be easily discriminated, as shown in FIG. 10A. When the number of switches for various kinds of operation is increased, there is no space where such a panel can be disposed.

To cope with this problem, according to this embodiment, components for operating the air conditioner are dispersingly disposed and interconnected through a bus line so that they can be easily operated, and thus a particular space is not required for the disposition of these switches.

Figure 11:
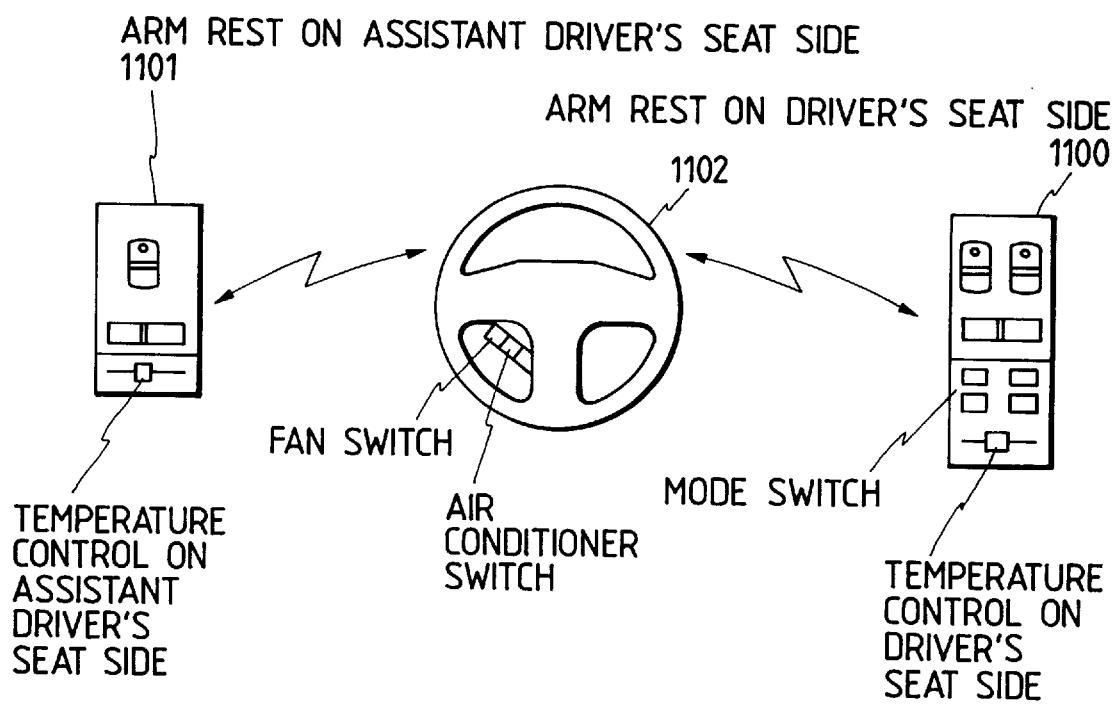
FIG. 11 is a diagram showing an example of the layout of zone controlling switches for an air conditioner according to the present invention.

More specifically, in FIG. 11, an air conditioner switch for turning ON/OFF the air conditioner and a fan switch for turning ON/OFF a fan are disposed on a steering wheel 1102 or the like so that they can be operated by a driver. Further, components which must be operated by the driver such as a mode switch for setting the mode of the air conditioner such as a cooling mode and warming mode and a regulation switch (eg. a lever) for regulating the temperature of a driver side are integrally disposed on the arm rest on the driver side as a driver side arm rest module 1100, and further components which must be operated by an assistant driver such as a switch for regulating the temperature of an assistant driver side, and the like are integrally disposed on the arm rest on the assistant driver side as an assistant driver side arm rest module 1101.

With this disposition, the components to be operated by the driver and assistant driver are disposed in the vicinity of them so that the driver and assistant driver can operate these components more conveniently. Since the integrally disposed operation switches occupy a smaller space, a particular position for disposing them need not be taken into consideration, and since the functions of the operation switches are substantially apparent from the positions where they are disposed, a space for displaying them can be greatly reduced.

Figure 12:
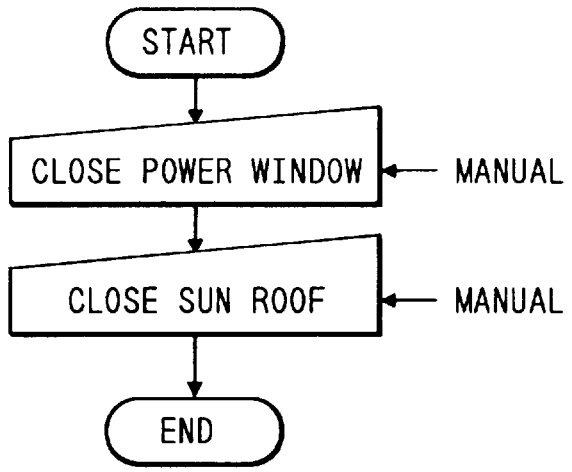
FIG. 12 is a flowchart showing a conventional job to be executed in automobile when it rains.
Figure 13:
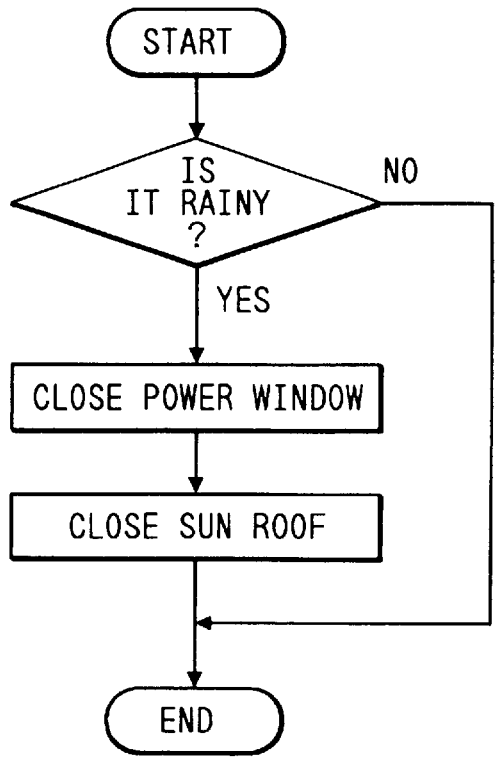
FIG. 13 is a flowchart showing a control operation to be executed in the present invention when it rains.

(5) Control When It Rains:

Conventionally, automobiles employ a system by which wipers are automatically operated when it rains. For this purpose, a wiper module includes a rain droplet sensor and when the sensor senses a signal of rain droplets, the wiper module is automatically operated. As shown in FIG. 12, however, since units such as power windows and a sun roof cannot sense the above signal, when they are opened, they must be manually closed.

Figure 14:
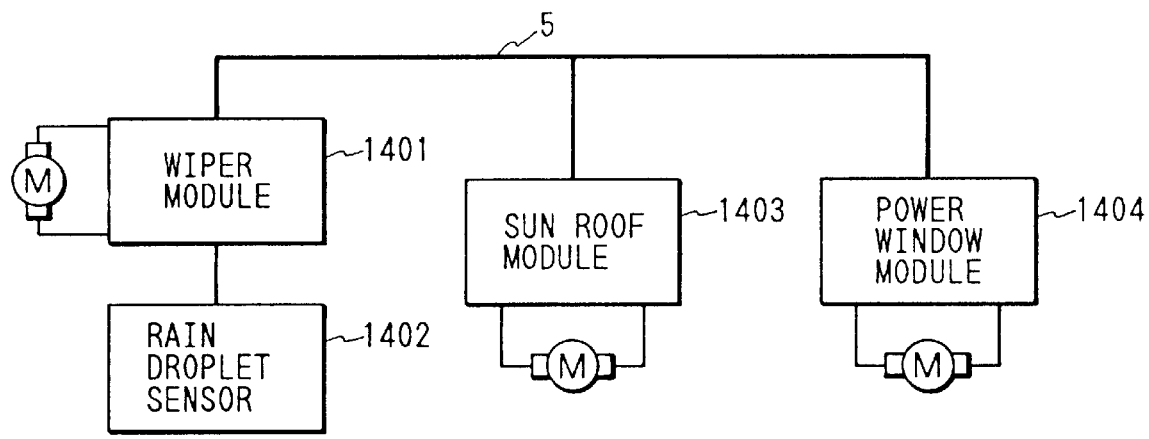
FIG. 14 is a diagram showing a control system to be executed when it rains according to the present invention.

This embodiment further develops this system. Since the respective electric units are interconnected through the bus line and communication can be carried out among them through the bus line as shown in FIG. 1, communication also can be made among the electric units of a wiper module 1401, sun roof module 1403 and power window module 1404 as shown in FIG. 14, and when it is sensed by the rain droplet sensor 1402 that it begins to rain, the wipers are operated by the operation of the wiper module 1401 in the same way as prior art as well as communication is carried out from the wiper module 1401 to the sun roof module 1403 and power window module 1404. Thus, these modules are operated to automatically close a not shown sun roof and power windows.

Since all the operations to be employed against rainfall can be automatically carried out as described above, a time-consuming job is omitted from passengers.

(6) Self-Learning Function of Seat Memory:

As described in the above personal seat position control, data indicating seat positions is stored in the personal position memory and the usual positions, backward positions and the like of the seats are regulated based on the data. At this time, a position sensor is provided with each seat, and when the seat is actually moved and its position is determined, the voltage value of the position sensor at the determined position is stored to the personal position memory as data representing the position. Further, when the seat is moved after data is set to the personal position memory, the seat is located at the position where the voltage of the position sensor coincides with the data value stored in the personal position memory.

In this case, when the seat is moved to the limit position within a mechanically movable range and the voltage value of the position sensor at that time is stored to the personal position memory as data, if the seat cannot be moved to the limit position within the movable range due to the change of the movable range of the seat or the aged deterioration of the position sensor which are caused thereafter, the voltage of the position sensor does not coincide with the data value of the personal position memory indefinitely. Thus, a seat drive motor is indefinitely energized.

To prevent this phenomenon, the actually movable range of the seat of this embodiment is set narrower than the mechanically movable range thereof. More specifically, when it is assumed in FIG. 15 that point A represents the mechanically forwardly movable limit position of a seat and point B represents the mechanically backwardly movable limit position of the seat, the seat can be mechanically moved within the range from the point A to the point B. In this embodiment, however, data stored in the personal position memory is set such that the actual movable range of the seat is set from point A' backwardly of the point A to point B' forwardly of the point B. Therefore, the seat cannot be moved in the shaded regions in FIG. 15. These unmovable regions are set to, for example, about a few percentages of the range between the point A and the point B. This is referred to as k % hereinafter.

To set such a movable range, first, the seat is set to the position A and the voltage VA of the position sensor at the time is sensed and next the seat is set to the position B and the voltage VB of the position sensor at the time is sensed. Then, k % of the difference between these sensed voltages is determined and added to the voltage VA and a resulting voltage is used as the data of the point A' and the k % of the difference is subtracted from the voltage VB and a resulting voltage is used as the data of the point B'. Therefore, the voltage VA' at the point A' and the voltage VB' at the point B' are represented by the following formulas, respectively.

$$VA'=VA+k\cdot(VB-VA)$$

$$VB'=VB-k\cdot(VB-VA)$$

Figure 15:
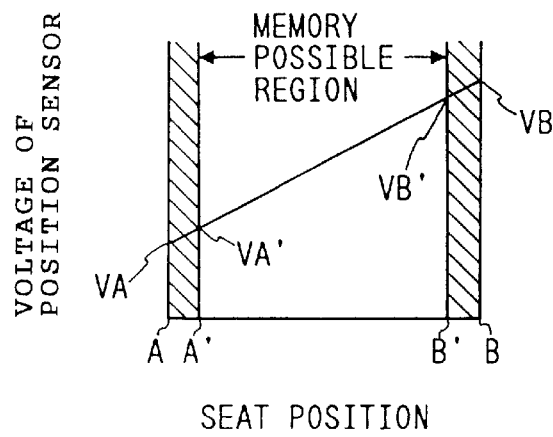
FIG. 15 is a diagram showing the self-learning function of a seat memory according to the present invention.

The above voltages are also shown in FIG. 15.

As described above, according to this embodiment, the seat is surely set to the position designated by the data stored in the personal position memory and thus the seat drive motor is not energized indefinitely.

Figure 16A:
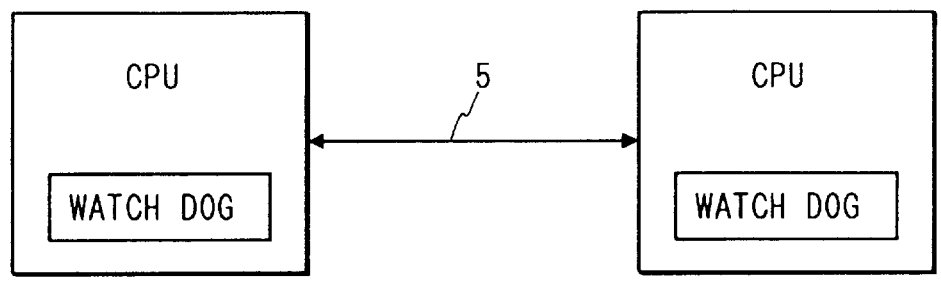
FIGS. 16A and 16B are diagrams showing a conventional watch dog system.
Figure 16B:
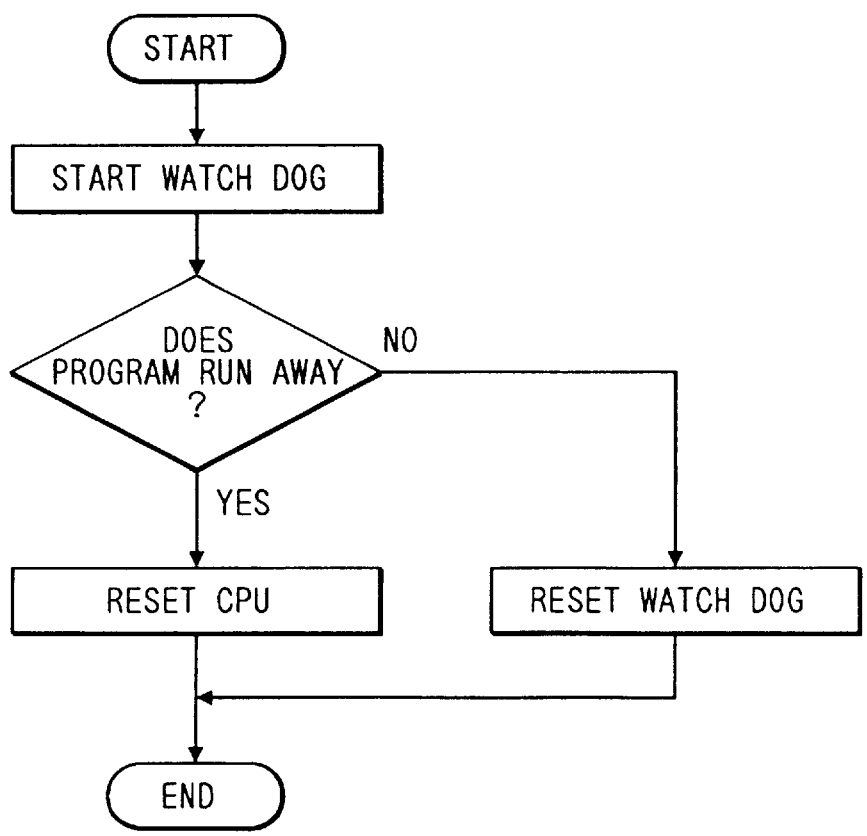

(7) Bus Monitoring Type Watching Circuit:

The multiple communication system is provided with a watch dog circuit for detecting an abnormal condition of the respective electric units, and as shown in FIG. 16A, the watch dog circuit is disposed in the CPU of the respective electric units so that the abnormal condition can be detected with respect to each CPU. As shown in FIG. 16B, the watch dog circuit operates such that when the circuit is started, it determines whether the program of the CPU runs away or not, and when the program runs away, the CPU is reset, and when the program does not run away, the watch dog circuit is reset.

However, such a watch dog circuit can detect only the abnormal condition of the CPU, and when communication is carried out among a plurality of the electric units, the abnormal condition of a communication line must be detected by software. In this case, however, the reliability of communication is lowered.

Figure 17A:
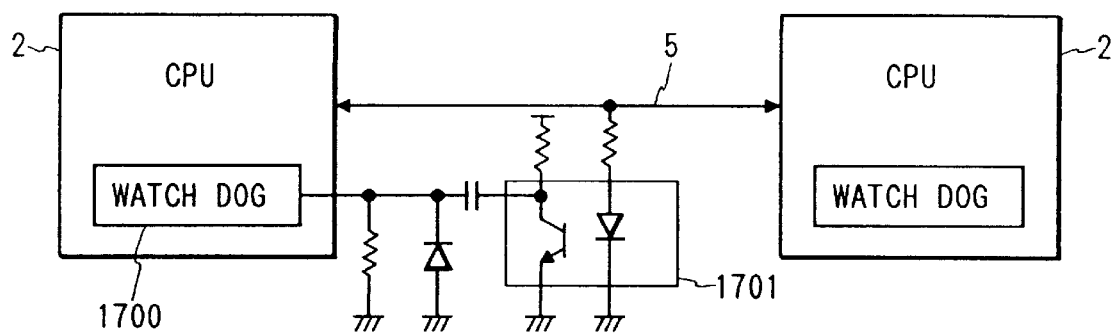
FIGS. 17A and 17B are diagrams showing a watch dog system according to the present invention.

Thus, as shown in FIG. 17A, this embodiment is provided with abnormal condition detection means including a photocoupler 1701 for detecting the abnormal condition of the bus line 5 so that a watch dog circuit 1700 can detect the abnormal condition of the communication line (bus line 5) through the abnormal condition detection means.

Figure 17B:
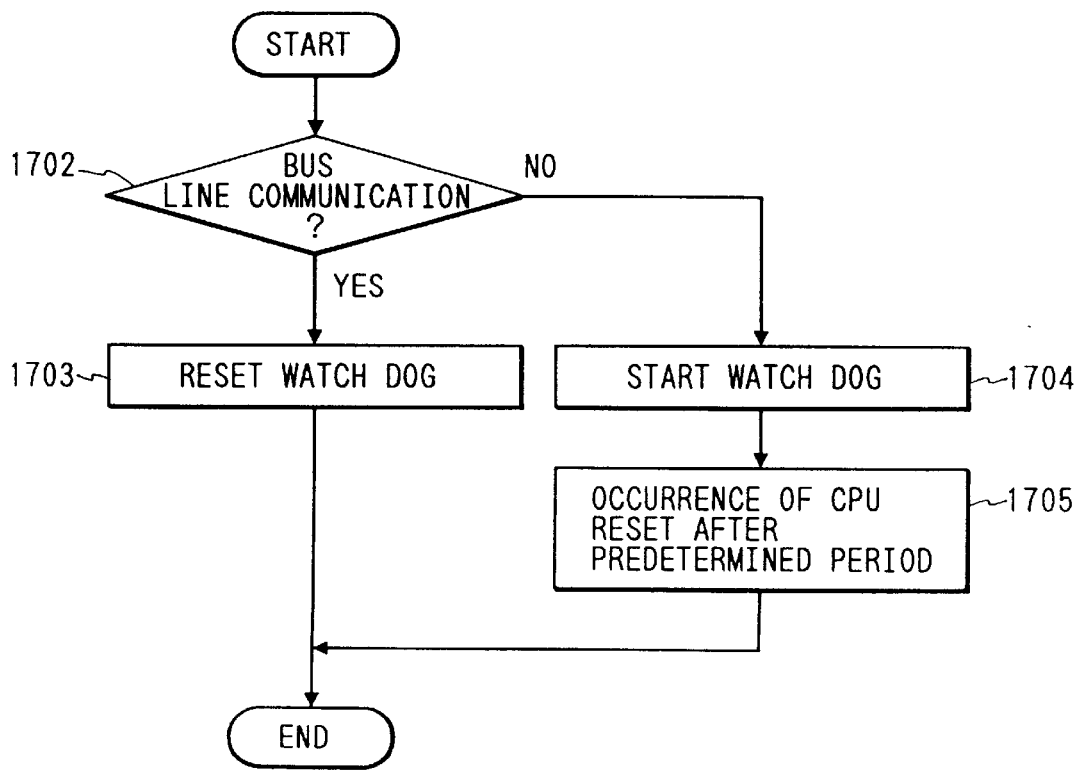
Figure 18:
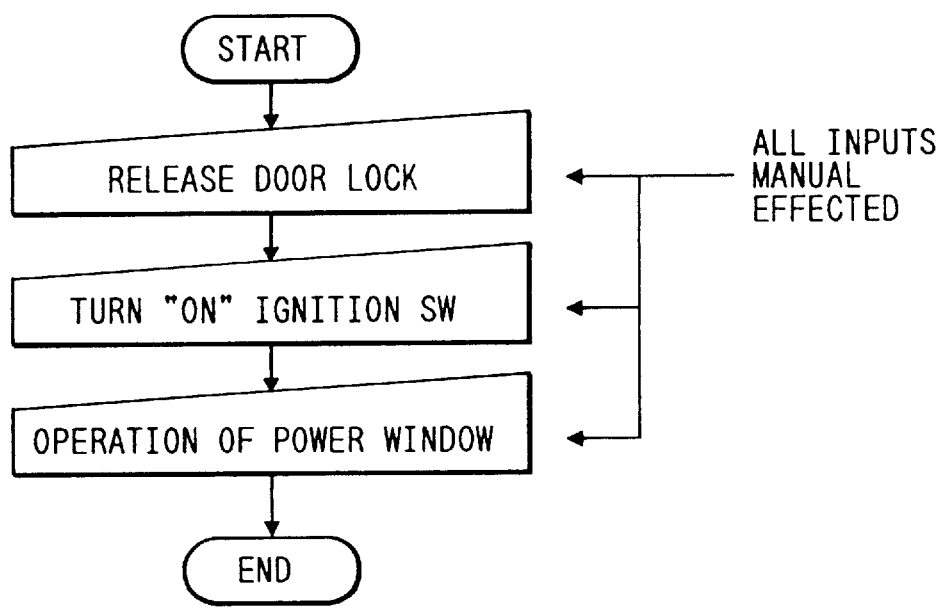
FIG. 18 is a flowchart showing a conventional window release job after an automobile parks in the daytime.

More specifically, the CPU 2 determines whether communication is carried out through the bus line 5 or not (step 1702) in FIG. 17B, and when communication is being carried out, the CPU 2 resets the watch dog circuit 1700 (step 1703), and when communication is not being carried out, the CPU 2 starts the watch dog circuit 1700 (step 1704). Then, when communication is not carried out in a preset period of time, it is determined that an abnormal condition arises and the CPU 2 is reset (step 1705).

With this arrangement, the abnormal condition of the communication line can be detected without lowering the reliability of communication.

(8) Automatic Window Open Control:

When an automobile parks for a long time at a high outside air temperature in the state that windows are closed, the temperature of a passenger compartment abnormally increases. Even if a passenger tries to get on the automobile in this state by opening a door, the passenger may not be able to get thereon immediately. In such a case, all the doors or windows are usually opened by hand for the ventilation of the passenger compartment and then the passenger gets on the automobile, which is very troublesome and inconvenient.

Figure 19:
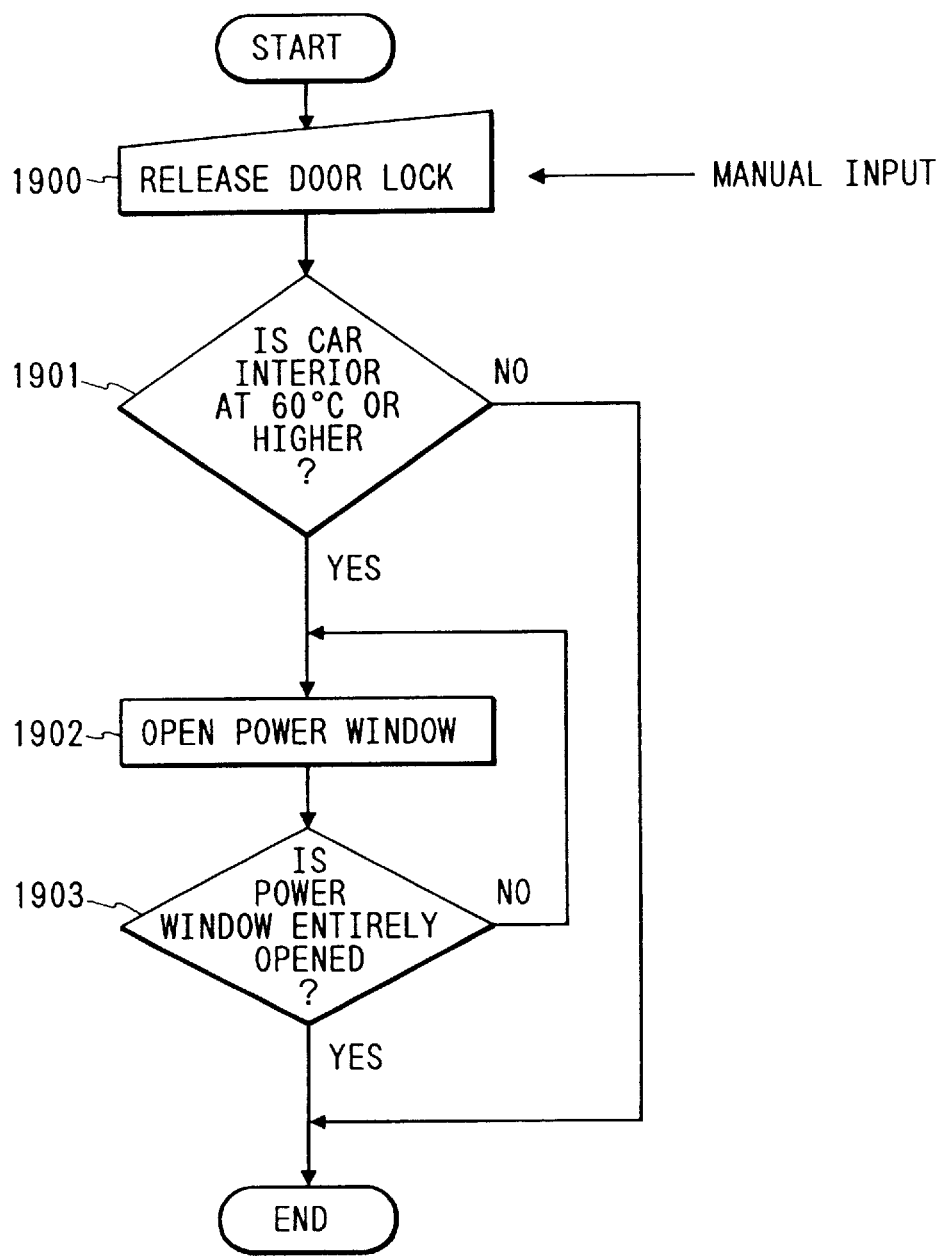
FIG. 19 is a flowchart showing a window open/close control operation according to the present invention.

To cope with this problem, this embodiment is arranged such that when door lock is released (step 1900), a passenger compartment temperature sensor senses the temperature of a passenger compartment as shown in FIG. 19. When the detected temperature has an abnormal value such as, for example, 60° C. (step 1901), the power window electric unit is operated to entirely open power windows (steps 1902, 1903).

Note, when the automobile is provided with a sun roof, a sun roof electric unit may be also operated in association with the power window electric unit to simultaneously open the sun roof.

With this arrangement, when the door lock is released, all the windows are automatically opened so that a job for opening the windows can be omitted.

(9) Automatic Window Close Control:

When an automobile parks and all the passengers leave from the automobile, doors are locked and all the windows are closed. At this time, since the windows are closed by hand, they may be left opened by mistake. In such a case, this embodiment prevents the windows from being left opened by the operation of the power window electric unit.

Figure 20:
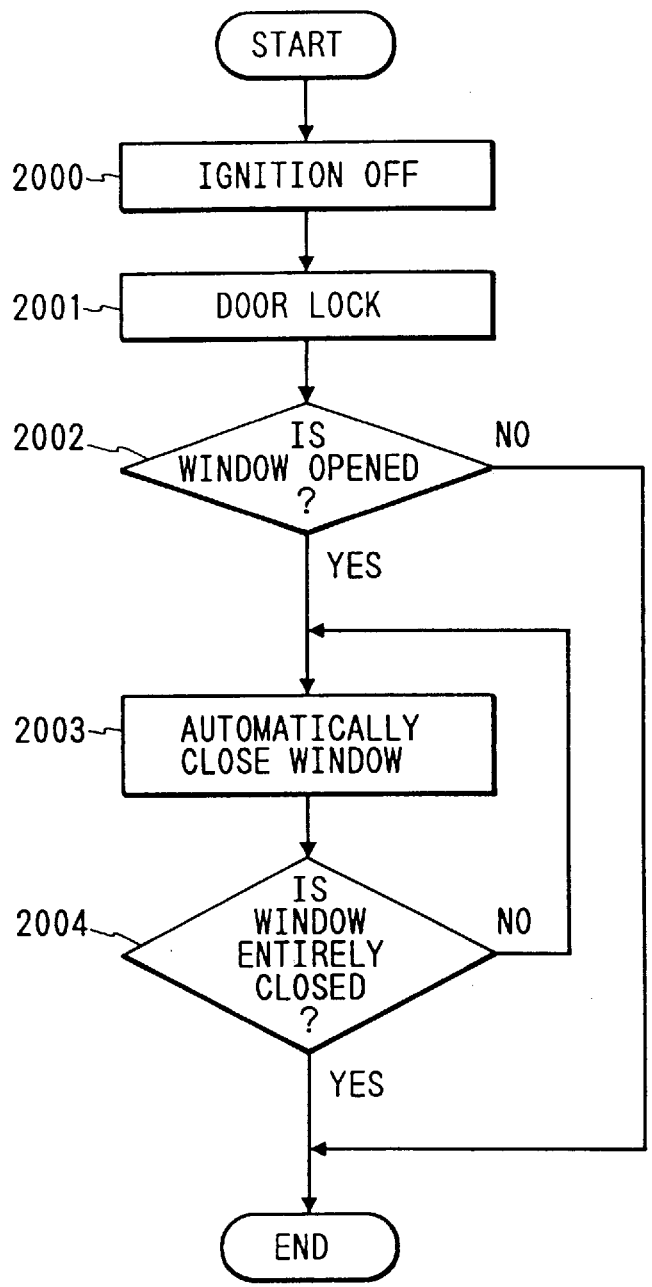
FIG. 20 is a flowchart showing an automatic window close control operation in the present invention.
Figure 21:
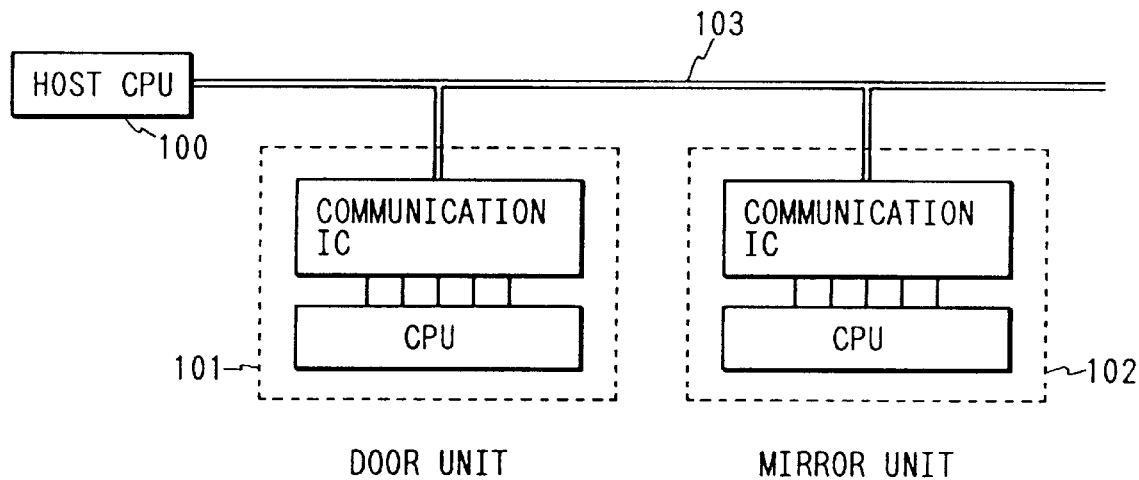
FIG. 21 is a diagram showing the arrangement of an example of a conventional multiple communication system.
Figure 22:
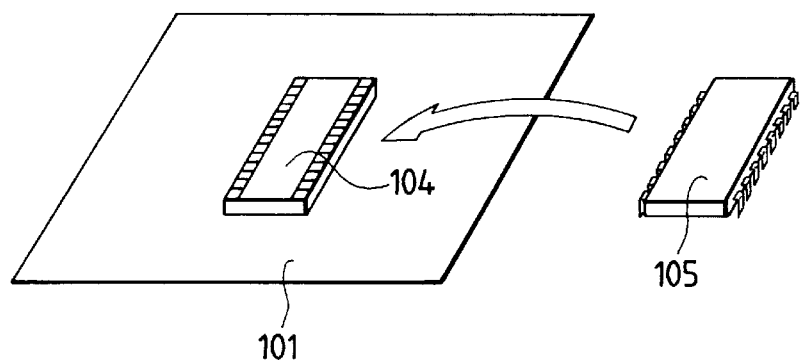
FIG. 22 is a diagram showing a method of changing a communication processing program in the electric unit shown in FIG. 21.

More specifically, in FIG. 20, when an engine is stopped and an ignition key is removed (step 2000) and doors are locked (step 2001), the above electric unit determines whether any window is opened or not (step 2002), and when it is opened, the opened window is entirely closed (steps 2003, 2004).

Note, when the automobile is provided with a sun roof, a sun roof electric unit may be also operated in association with the power window electric unit to simultaneously close the sun roof.

With this arrangement, a job for closing the windows can be omitted and further the windows are prevented from being left opened by mistake.

As described above, according to the present invention, since a communication control can be carried out by the electric units which do not need the conventionally used communication ICs, the electric units can be greatly miniaturized and the port of the CPU constituting each electric unit has a surplus portion, and thus the number of input means to be connected to the CPU and the number of objects to be controlled can be increased so that the electric unit can be multi-functioned.

Further, according to the present invention, since the communication processing program of the electric unit can be rewritten from the outside through the bus line, a job for changing a communication procedure and the like can be greatly simplified.

Further, according to the present invention, the respective portions of an automobile can be automatically operated, so that the automobile can be comfortably driven with the improved convenience for use.

What is claimed is:

1. A multiple communication system for an automobile comprising:

a common bus line; and a plurality of electric units connected to said common bus line, wherein each of said electric units comprises:

a central processing unit including a rewritable memory for storing a communication processing program, and a bus driver connected between the central processing unit and the common bus line such that the central processing unit is connected to the common bus line only through the bus driver;

wherein each of the central processing units generates control signals on said common bus line and/or receives control signals from said common bus line according to commands generated by the communication processing program stored in said rewritable memory associated with said central processing unit such that direct communication is carried out among said electric units through said common bus line, wherein said communication processing program stored in said rewritable memory of each of said central processing units is completely rewritable by electric signals transmitted on said common bus line, wherein a first unit of the plurality of electric units includes a first central processing unit connected to a shift lever of the automobile for generating a first signal on the common bus line in response to movement of the shift lever into a reverse position, and for generating a second signal on the common bus line when the shift lever is removed from the reverse position, and wherein a second unit of the plurality of electric units includes a second central processing unit connected to a mirror positioning mechanism for controlling a position of a mirror mounted on the automobile, the second central processing unit controlling the mirror positioning mechanism to position said mirror into a first predetermined position in response to the first signal transmitted on said common bus line indicating that the shift lever of said automobile is entered into a reverse drive position, and for controlling the mirror positioning mechanism to reposition said mirror into an original position in response to the second signal indicating that said shift lever is removed from the reverse drive position.

2. A multiple communication system comprising:

a common bus line; and a plurality of electric units connected to said common bus line, wherein each of said electric units comprises:

a central processing unit including a rewritable memory for storing a communication processing program, and a bus driver connected between the central processing unit and the common bus line such that the central processing unit is connected to the common bus line only through the bus driver;

wherein each of the central processing units generates control signals on said common bus line and/or receives control signals from said common bus line according to commands generated by the communication processing program stored in said rewritable memory associated with said central processing unit such that direct communication is carried out among said electric units through said common bus line, wherein said communication processing program stored in said rewritable memory of each of said central processing units is completely rewritable by electric signals transmitted on said common bus line, wherein a first unit of the plurality of electric units includes a first central processing unit connected to a power seat unit including a seat sensor for sensing positions of automobile seats, a memory for storing data associated with predetermined positions of said seats, and a seat positioning mechanism for controlling the positions of said automobile seats, wherein a second unit of the plurality of electric units includes a second central processing unit connected to a door lock unit for generating a door lock release signal when a door lock of the automobile is changed from a locked to an unlocked condition, and wherein said power seat unit positions said seats into predetermined positions in response to the door lock release signal produced when the door lock is changed from a locked to an unlocked condition, the door lock release signal being transmitted to the power seat unit on said common bus line, and when said seats reach the predetermined positions, said seat sensor transmits a seated signal, and said power seat unit moves said seats to positions designated by the data stored in said memory in response to the seated signal.

3. The multiple communication system according to claim 2, wherein one of the electric units is a receiver for a keyless entry device, the receiver transmitting the door unlock command signal on the common bus line in response to a received signal from the keyless entry device.

4. A multiple communication apparatus, comprising:

common bus line; and a plurality of electric units connected to said common bus line, wherein each of said electric units comprises:
  a central processing unit including a rewritable memory for storing a communication processing program, and
  a bus driver connected between the central processing unit and the common bus line such that the central processing unit is connected to the common bus line only through the bus driver;

wherein each of the central processing units generates control signals on said common bus line and/or receives control signals from said common bus line according to commands generated by the communication processing program stored in said rewritable memory associated with said central processing unit such that direct communication is carried out among said electric units through said common bus line, wherein said communication processing program stored in said rewritable memory of each of said central processing units is completely rewritable by electric signals transmitted on said common bus line, wherein one of said electric units is an arm rest module includes a door lock switch and a door lock control unit for controlling a door lock in response to actuation of the door lock switch, wherein the arm rest module further comprises a connector adapted to receive a keyless entry receiver circuit such that the keyless entry receiver circuit is connected to the door lock control unit, and wherein the door lock control unit is programmable over the common bus line to control the door lock in response to signals generated by the keyless entry receiver circuit.

5. A multiple communication apparatus, comprising:

common bus line; and a plurality of electric units connected to said common bus line, wherein each of said electric units comprises:
  a central processing unit including a rewritable memory for storing a communication processing program, and
  a bus driver connected between the central processing unit and the common bus line such that the central processing unit is connected to the common bus line only through the bus driver;

wherein each of the central processing units generates control signals on said common bus line and/or receives control signals from said common bus line according to commands generated by the communication processing program stored in said rewritable memory associated with said central processing unit such that direct communication is carried out among said electric units through said common bus line, wherein said communication processing program stored in said rewritable memory of each of said central processing units is completely rewritable by electric signals transmitted on said common bus line, wherein said electric units include a wiper unit and a power window unit, wherein said wiper unit includes a raindrop sensing means for generating a rain droplet sensing signal in response to sensed rain droplets, and for transmitting the rain droplet sensing signal on said common bus line, wherein said wiper unit further includes means for operating a wiper in response to said rain droplet sensing signal, and wherein said power window unit includes means for performing an automatic closing operation in response to said rain droplet sensing signal.

* * * * *